(12) United States Patent
Morrison et al.

(10) Patent No.: US 11,846,653 B2
(45) Date of Patent: *Dec. 19, 2023

(54) SCANNING PROBE MICROSCOPE AND METHOD FOR RESONANCE-ENHANCED DETECTION USING A RANGE OF MODULATION FREQUENCIES

(71) Applicant: MOLECULAR VISTA, INC., San Jose, CA (US)

(72) Inventors: William Morrison, San Jose, CA (US); Derek Nowak, San Jose, CA (US); Josh Gioja, Paxton, IL (US); Sung I. Park, Saratoga, CA (US); Thomas R. Albrecht, San Jose, CA (US)

(73) Assignee: MOLECULAR VISTA, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/785,881

(22) PCT Filed: Dec. 17, 2020

(86) PCT No.: PCT/US2020/065748
§ 371 (c)(1),
(2) Date: Jun. 15, 2022

(87) PCT Pub. No.: WO2021/127274
PCT Pub. Date: Jun. 24, 2021

(65) Prior Publication Data
US 2023/0018874 A1 Jan. 19, 2023

Related U.S. Application Data

(60) Provisional application No. 62/949,404, filed on Dec. 17, 2019.

(51) Int. Cl.
*G01Q 60/34* (2010.01)
*G01Q 10/06* (2010.01)
*G01Q 20/02* (2010.01)

(52) U.S. Cl.
CPC .......... *G01Q 60/34* (2013.01); *G01Q 10/065* (2013.01); *G01Q 20/02* (2013.01)

(58) Field of Classification Search
CPC ....... G01Q 60/34; G01Q 10/065; G01Q 20/02
(Continued)

(56) References Cited

U.S. PATENT DOCUMENTS 5,496,999 A 3/1996 Linker
10,955,437 B2 * 3/2021 Albrecht ................ G01Q 60/34
(Continued)

FOREIGN PATENT DOCUMENTS

WO 2019079822 A1 4/2019

OTHER PUBLICATIONS

PCT/US2020/065748. International Search Report (dated Mar. 15, 2021).

*Primary Examiner* — Nicole M Ippolito
(74) *Attorney, Agent, or Firm* — LOZA & LOZA, LLP; Thomas H. Ham

(57) ABSTRACT

A scanning probe microscope and method for resonance-enhanced detection using the scanning probe microscope uses a light source that is modulated in a range of frequencies to irradiate an interface between a probe tip of the microscope and a sample with modulated electromagnetic radiation from the light source. The vibrational response of the driven cantilever in response to the modulated electromagnetic radiation at the interface between the probe tip and the sample is then detected. The amplitude of the vibrational (Continued)

response of the cantilever over the entire range of modulation frequencies is measured to derive a photo-induced force microscope (PiFM) value.

20 Claims, 5 Drawing Sheets

(58) Field of Classification Search
USPC .................................... 850/1, 2, 3, 4, 5, 6, 7
See application file for complete search history.

(56) References Cited

U.S. PATENT DOCUMENTS 11,150,267 B2 * 10/2021 Albrecht ................ G01Q 70/06
2009/0133168 A1    5/2009 Ando et al.

* cited by examiner

SCANNING PROBE MICROSCOPE AND METHOD FOR RESONANCE-ENHANCED DETECTION USING A RANGE OF MODULATION FREQUENCIES

CROSS REFERENCE TO RELATED APPLICATION

This application is entitled to the benefit of U.S. Provisional Patent Application Ser. No. 62/949,404, filed on Dec. 17, 2019, which is incorporated herein by reference.

BACKGROUND OF THE INVENTION

In scanning probe microscopy (SPM), it is often desirable to use a resonance of the cantilever probe to amplify the signal from a force being measured. This typically involves providing a modulated tip-sample force interaction at the frequency of the resonance, which can add energy over many cycles to create a much larger deflection than would be achieved by the same force modulation at a non-resonant frequency. However, as the probe interacts with the sample, its resonant frequency and Q may shift. In particular, different local material properties of the sample surface, and imperfect maintenance of the tip-sample distance can cause the resonant frequency to shift. When a specialized version of SPM, such as photo-induced force microscopy (PiFM) is used, absorption of light by localized regions of the sample can also affect the tip-sample force interaction and thereby shift the resonant frequency and Q. If a static excitation frequency is used, this fixed frequency will deviate from the peak frequency, and as a result, the amplification factor of the response of the cantilever is not constant. This varying amplification factor means that the sensitivity of the measurement can vary with time, location on the sample surface, or wavelength and intensity of light applied to the interface. Changes in response caused by such changes in resonance cause errors in the reported data, which are not easily corrected in the acquired data.

SUMMARY OF THE INVENTION

A scanning probe microscope and method for resonance-enhanced detection using the scanning probe microscope uses a light source that is modulated in a range of frequencies to irradiate an interface between a probe tip of the microscope and a sample with modulated electromagnetic radiation from the light source. The vibrational response of the driven cantilever in response to the modulated electromagnetic radiation at the interface between the probe tip and the sample is then detected. The amplitude of the vibrational response of the cantilever over the entire range of modulation frequencies is measured to derive a photo-induced force microscope (PiFM) value.

A method for resonance-enhanced detection using a scanning probe microscope in accordance with an embodiment of the invention comprises driving a cantilever with a probe tip of the scanning probe microscope to vibrate, modulating a light source in a range of frequencies to irradiate an interface between the probe tip and a sample with modulated electromagnetic radiation from the light source, detecting a vibrational response of the cantilever in response to the modulated electromagnetic radiation at the interface between the probe tip and the sample, and measuring amplitude of the vibrational response of the cantilever over the entire range of modulation frequencies to derive a photo-induced force microscope (PiFM) value.

A scanning probe microscope in accordance with an embodiment of the invention comprises a cantilever with a probe tip, a dither drive unit connected to the cantilever to drive the cantilever to vibrate, a light source to irradiate an interface between the probe tip and a sample, a signal generator connected to the light source to modulate the light source in a range of frequencies to irradiate an interface between the probe tip and the sample with modulated electromagnetic radiation from the light source, a detector to detect a vibrational response of the cantilever in response to the modulated electromagnetic radiation at the interface between the probe tip and the sample, and an amplitude measuring system to measure amplitude of the vibrational response of the cantilever over the entire range of modulation frequencies to derive a photo-induced force microscope (PiFM) value.

Other aspects and advantages of the present invention will become apparent from the following detailed description, taken in conjunction with the accompanying drawings, illustrated by way of example of the principles of the invention.

DETAILED DESCRIPTION

The need for monitoring and correcting for resonance changes in an SPM has been recognized in the past, and various types of solutions have been reported in existing literature and patents. One type of solution involves periodically or continuously measuring the frequency response of the cantilever resonant frequency or phase of the cantilever vibration and adjusting the appropriate modulation frequency in the SPM to track the changing resonant frequency. Another solution is to apply a range of frequencies (either by sweeping or use of band excitation) that covers expected changes in the resonant frequency, and to measure the response as a function of modulation frequency in order to determine the peak frequency and report the signal magnitude at the peak. A major shortcoming of both approaches is that the frequency response of a particular cantilever resonance often shows a level of complexity that makes identification of a single peak frequency difficult or impossible. Resonance frequency response curves can vary from an ideal Lorentzian-shaped single peak with a well-defined Q to a complex response curve with multiple maxima and minima, and an overall shape far removed from the ideal Lorentzian shape. In such cases, determining a "peak frequency" either to track or to report the response is problematic.

Figure 1:
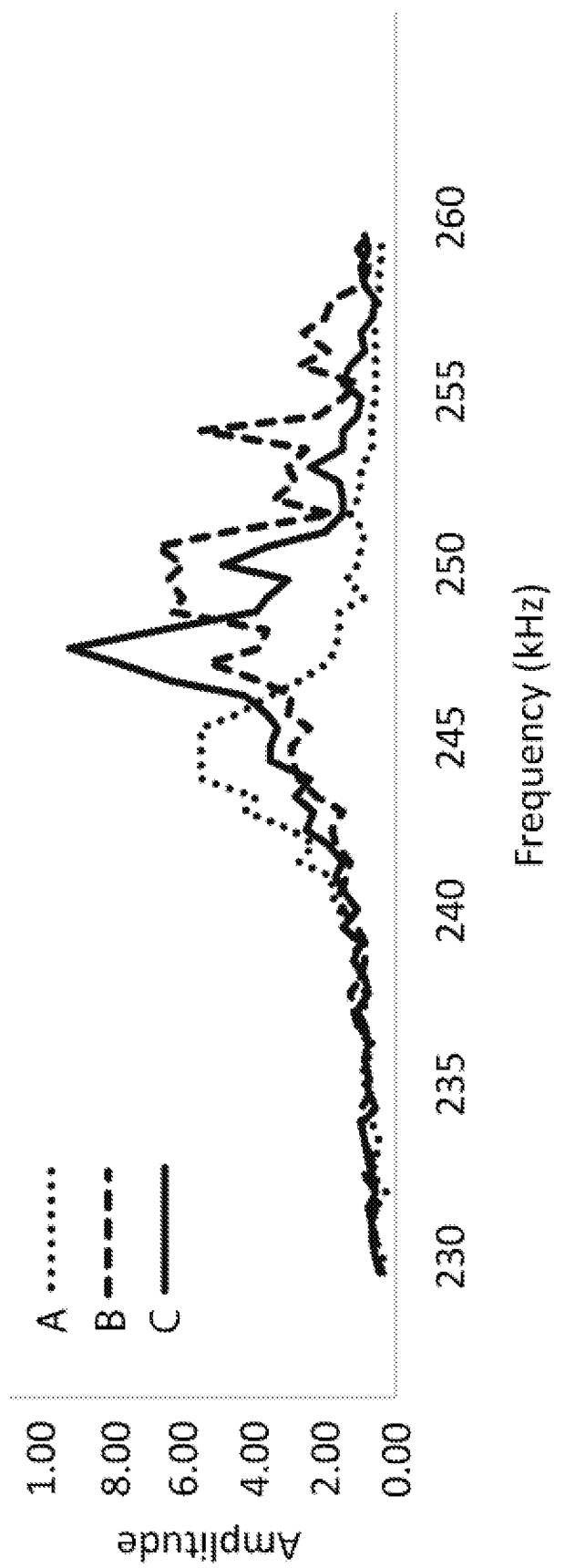
FIG. 1 show examples of three resonance curves taken on different locations on a nonuniform sample.

FIG. 1 shows examples of three resonance curves taken on different locations on a nonuniform sample. As can be seen in these three curves, both the peak frequency of the resonance and the overall structure of the curves change between the three locations. Of the three curves, curve C is closest to the expected peak shape, and curve B is particularly problematic, with multiple maxima that can cause errors in trying to identify one particular resonance peak. Although the phase of vibration is not shown in FIG. 1, it is likewise complicated, making it impossible for a phase locked loop to automatically select and lock to a single correct resonance peak.

Conventional peak tracking methods includes methods described in (1) R. Arinéro et al., "Image processing for resonance frequency mapping in atomic force modulation microscopy," Rev. Sci. Instrum. 78, 023703 (2007), (2) G. Ramer et al., "Implementation of Resonance Tracking for Assuring Reliability in Resonance Enhanced Photothermal Infrared Spectroscopy and Imaging," Appl. Spectrosc. 71, 2013-2020 (2017), (3) C. Prater and K. Kjoller, U.S. Pat. No. 8,680,467, "High frequency deflection measurement of IR absorption with a modulated IR source," filed Sep. 19, 2011, issued Mar. 25, 2014, and (4) Prater and K. Kjoller, U.S. Pat. No. 10,228,388, "Method and apparatus for resolution and sensitivity enhanced atomic force microscope based on infrared spectroscopy," filed Nov. 10, 2016, issued Mar. 12, 2019. These references focus on finding and reporting the peak frequency of the resonance curve and reporting the magnitude of response at the peak frequency.

Another conventional method includes a band excitation method described in S. Jesse et al., "The band excitation method in scanning probe microscopy for rapid mapping of energy dissipation on the nanoscale," *Nanotechnology* 18 435503 (2007). This reference has essentially the same interest in finding the peak frequency and the response at the peak frequency; the band excitation method is simply a method for simultaneously applying a range of frequencies and measuring the response as a function of frequency within that range. Although the band excitation method has certain advantages over peak tracking methods which sweep or track the frequency, its output is not integrated over the range of interest, and therefore it shares the same shortcomings as peak tracking methods when the frequency response of the resonance has a complex behavior.

Embodiments of the invention address this shortcoming by solving the problem in a different manner. Instead of seeking to track the changing resonant frequency, or to apply a range of frequencies with the objective of finding the response at a single "peak" frequency, the response over a range of frequencies is integrated and reported. This has the effect of summing up the response at all frequencies within the range of interest, which is particularly advantageous when the frequency response curve is not a well-behaved single Lorentzian peak. The range of frequencies can be applied either by sweeping a single frequency over the target range, or by band excitation, which applies a range of frequency components simultaneously. In the case of using a swept frequency, typical lock-in signal detection can be used with an integrator at the output. In the case of band excitation, a single amplitude envelope measurement can be made.

Figure 2:
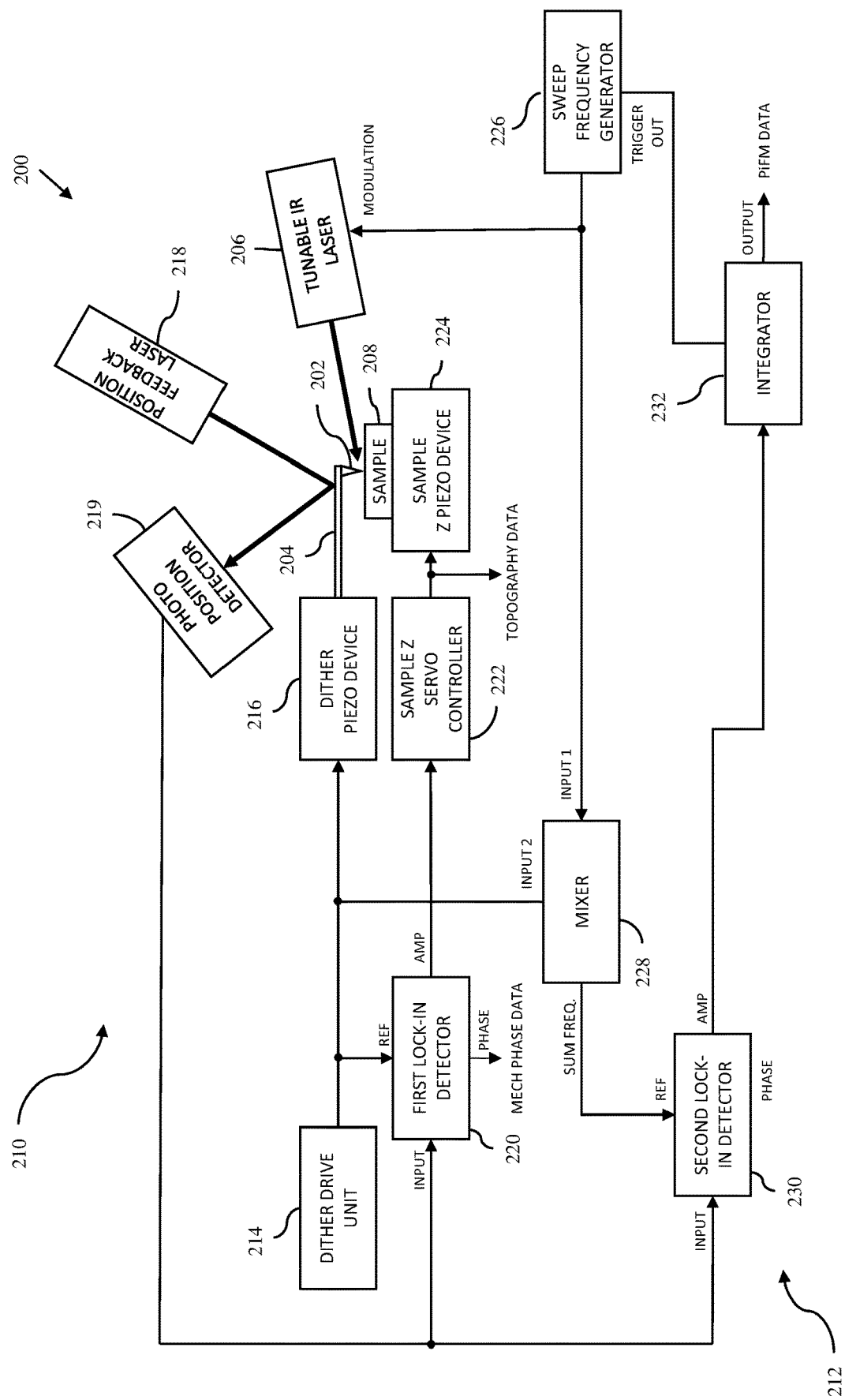
FIG. 2 shows a scanning probe microscope in accordance with an embodiment of the invention.

Turning now to FIG. 2, a PiFM apparatus 200, which is a scanning probe microscope, in accordance with an embodiment of the invention is shown. The PiFM apparatus 200 includes a probe tip 202 coupled to a cantilever 204, a light source 206 in the form of a modulated tunable laser 206 to irradiate an interface between the probe tip and a sample 208 with electromagnetic radiation, a dither control system 210 for establishing a fixed distance between the probe tip and the sample, and a laser modulation control system 212 for modulating the tunable laser in a range of modulation frequencies to output an integrated amplitude value for the entire range of modulation frequencies as PiFM data, which can be used to image the sample. In an embodiment, the modulated tunable laser 206 is an infrared (IR) laser.

The dither control system 210 of the PiFM apparatus 200 includes a dither drive unit 214, a dither piezo device 216 coupled to the cantilever 204, a position feedback laser 218, a photo position detector 219, a first lock-in detector or amplifier 220, a sample Z servo controller 222, and a sample Z piezo device 224. For the example of amplitude modulation (AM) detection (also called "slope detection"), the dither drive unit 214 is configured to provide a signal with a desired drive frequency to the dither piezo device 216, which causes the cantilever 204 to vibrate. The photo position detector 219 optically measures the vibration of the cantilever 204 using light from the position feedback laser 218 reflected off the cantilever. The signal from the photo position detector 219 is input to the first lock-in detector 220, which provides amplitude error signal to the sample z servo controller 222. The amplitude error signal indicates that the spacing between the tip 202 and the sample 208 has deviated from desired spacing. In response, the sample z servo controller 222 provides a control signal to the sample z piezo device 224 so that the spacing between the tip 202 and the sample 208 can be adjusted. In particular, the dither frequency is fixed at a point slightly above the resonance frequency of the dither vibrational mode of the cantilever 204. If the tip-sample spacing falls below the target value, the dither mode frequency shifts downward, effectively moving the dither drive frequency further above resonance, resulting in decreased dither amplitude (and vice versa). The sample Z servo controller 222 determines the amplitude error and applies a correction to the voltage on the sample Z piezo device 224 to bring the tip-sample spacing back to the target value. As the sample 208 is raster scanned relative to the tip 202, topography data is obtained at the output for the sample Z servo controller 222, and mechanical phase data (relating to sample mechanical stiffness and damping) is provided at the phase output of the lock-in detector 220.

The dither control system 210 could be replaced with a frequency modulation (FM) detection scheme, with no impact on the rest of the PiFM apparatus 200. When operating with very high cantilever Q, FM may be preferred, since the control loop response speed, and therefore the imaging speed, can be too slow with an AM approach.

The laser modulation control system 212 of the PiFM apparatus 200 includes a sweep frequency generator 226, an electronic mixer 228, a second lock-in detector or amplifier 230 and an integrator 232. The sweep frequency generator 226 operates to generate modulation drive signals for the tunable laser 206 in a range of swept modulation frequencies, which includes the resonant frequency. The range of swept frequencies may be the resonant frequency of the cantilever 204 plus or minus 5% or greater. As an example, in FIG. 1, if the resonant frequency is 247 kHz, the range of swept frequencies may be 230 kHz to 260 kHz, which would correspond to +/−6% (or 12% range). The electronic mixer 228 operates to mix the dither drive signal at a first frequency from the dither drive device 214 and the modulation drive signal at a second frequency from the sweep frequency generator 226 to generate an output signal at a sum frequency, which coincides with the cantilever resonance frequency. The second lock-in detector 230 uses the sum frequency signal from the mixer 228 as a reference on the cantilever vibration response signal from the photo position detector 219 to generate an output, which represents the amplitude of the cantilever vibration for the current modulation frequency. The integrator 232 operates to integrate the output of the second lock-in detector 230 as the modulation frequency applied to the tunable laser 206 is swept through the range of modulation frequencies. The output of the integrator 232 is PiFM data for each measured position of the sample, which can be used to image the sample 208. Since the mixer 228, the second lock-in detector 230 and the integrator 232 operate to measure the integrated amplitude value, these components can be viewed as being part of an amplitude measuring system.

In an operation according to an embodiment, the tunable infrared (IR) laser 206 of the PiFM apparatus 200, which is pulsed or amplitude modulated, radiates light into the interface between the probe tip 202 and the sample 208. In this embodiment, the PiFM apparatus 200 is operated in sideband mode, with the laser modulation frequency being the difference frequency between the dither drive frequency and the resonant frequency of the vibrational mode used for PiFM detection. Instead of a fixed frequency signal generator, the PiFM apparatus 200 in this embodiment uses the sweep frequency generator 226, which sweeps over a frequency range wide enough to cover expected shifts in the cantilever resonance frequency in the course of the experiment. Nonlinear interactions between the illuminated tip 202 and sample 208 result in frequency mixing of the laser modulation frequency and the dither frequency that produces the sum frequency, which coincides with the cantilever resonance. This same frequency is generated by the electronic mixer 228 using the signal from the dither drive unit 214 and the signal from the sweep frequency generator 226. The cantilever deflection signal from the photo position detector 219, which includes a PiFM component at the sum frequency is applied to the input of the second lock-in detector 230, and the reference signal for this lock-in detector is the electronically generated sum frequency from the mixer 228. During each frequency sweep by the sweep frequency generator 226, the amplitude output of the second lock-in detector 230 is integrated to provide a single integrated PiFM value at the end of each sweep, which is a single PiFM data point that can be used for PiFM imaging. In an embodiment, the sweep frequency generator 226 may be configured to produce an optional trigger output after each frequency sweep, which may be used to clear the integrator 232 prior to the start of each frequency sweep.

In some embodiments, various experimental factors may be selected to optimize the measured PiFM data. As an example, the tip-sample position, time, wavelength of applied light, tip-sample distance, sample temperature, the intensity of the applied light and/or the type of tip and its coating may be selected to derive optimized PiFM data. In addition, in some embodiments, an alternative to using the sum frequency is to use the difference frequency, which is also generated by the mixer 228. Likewise, in some embodiments, an alternative to using the difference frequency is to use the sum frequency.

It should be noted that the time constant for the output of the second lock-in detector 230 should be significantly shorter than the sweep repetition rate (a typical value would be 5 X-50 X shorter), unless it is intended to use the output time constant as the mechanism of integration. Furthermore, the sweep repetition rate should be significantly slower than the time constant of amplitude changes in the cantilever 204 (a typical value would be 5 X-50 X shorter), which is determined by the frequency and Q of the cantilever vibration at the PiFM signal frequency. These factors limit the speed of PiFM data acquisition.

Figure 3:
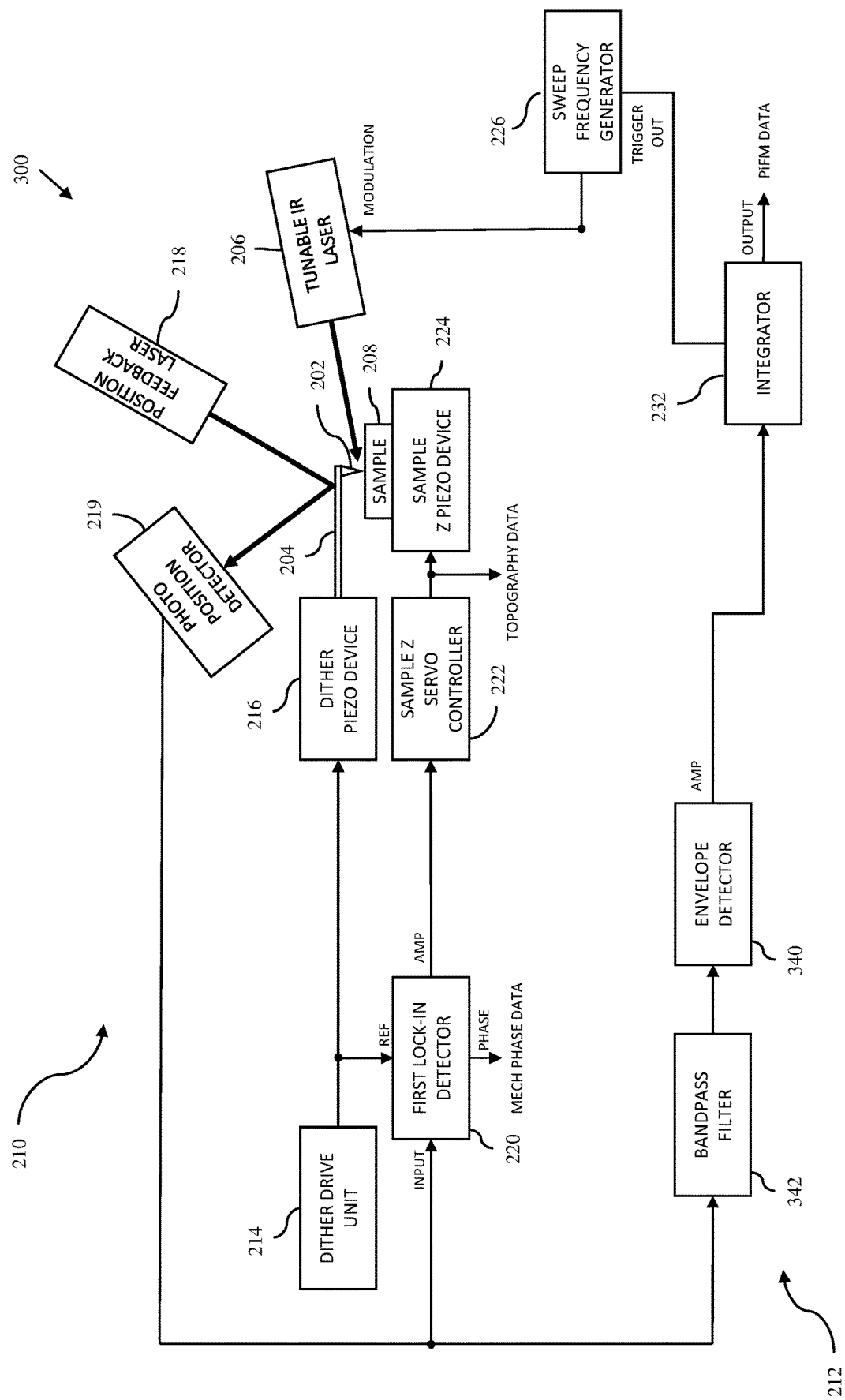
FIG. 3 shows a scanning probe microscope in accordance with an alternative embodiment of the invention.

Turning now to FIG. 3, a PiFM apparatus 300 in accordance with an alternative embodiment of the invention is shown. In this embodiment, an envelope detector 340 with a bandpass filter 342 is used in place of the second lock-in detector 230, which in turn eliminates the need for the electronic mixer 228. All the other components of the PiFM apparatus 300 are similar to the PiFM apparatus 200 depicted in FIG. 2.

The bandpass filter 342 is used to allow only the cantilever vibrational response signal from the photo position detector within a predefined range of frequencies, which coincides with the swept frequency range applied to the tunable laser 206. The bandpass filtered signal is then applied to the envelope detector 340 to detect the desired amplitude signal. The output of the envelope detector 340 is then transmitted to the integrator 232, which integrates the amplitude signal during each frequency sweep to generate the PiFM data.

Figure 4:
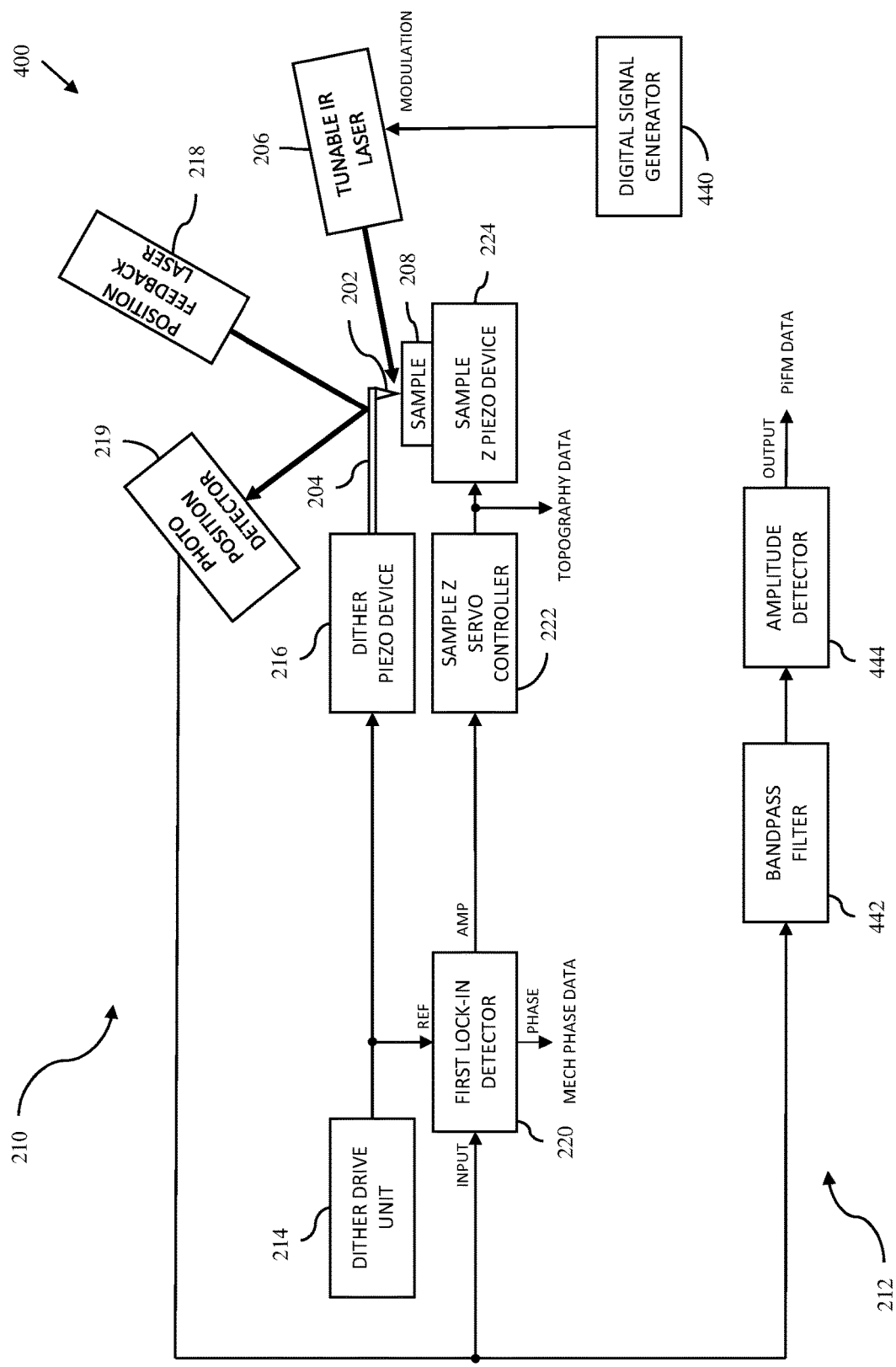
FIG. 4 shows a scanning probe microscope in accordance with an another embodiment of the invention.

Turning now to FIG. 4, a PiFM apparatus 400, which uses a band excitation approach, in accordance with another embodiment of the invention is shown. In this embodiment, the sweep frequency generator 226 is replaced with a digital signal generator 440 (also known as a digital waveform generator) that generates a waveform signal via a reverse Fourier transform from a frequency spectral density function specified by the user (i.e., covering the frequency range of interest). In this embodiment, a bandpass filter 442 and an amplitude detector 444, such as an envelope detector, is used in place of the second lock-in detector 230, and there is no electronic mixer 228 and no integrator 232. The output of the amplitude detector 444 may be sampled on a continuous basis to provide the PiFM data.

In operation, the digital signal generator 440 provides a modulation signal to the tunable laser so that the light from the tunable laser applied to the tip-sample interface is simultaneously modulated in a band of frequencies that coincides with the target range of frequencies. The cantilever deflection signal from the photo position detector 219 is then passed through the bandpass filter 442 to the amplitude detector 444. The amplitude output from the amplitude detector 444 is the PiFM data, which can be used to image the sample 208.

In the embodiment described above with respect to FIG. 2, the PiFM apparatus 200 is operating in the sideband PiFM mode, where the modulation frequencies applied to the light source, e.g., the tunable IR laser 206, are difference frequencies between the dither frequency and a range of frequencies overlapping the expected resonance frequency of the cantilever 204 for the vibrational mode excited by PiFM forces. In another embodiment, the PiFM apparatus 200 may be operated in the direct PiFM mode, in which the light source is modulated with a range of frequencies that overlaps the resonance. This embodiment does not rely on mixing between the dither and light source modulation frequencies, and the electronic mixer 228 is eliminated, with the modulation frequency of the light source serving as the reference frequency for the second lock-in detector 230.

In the embodiments of a PiFM apparatus described herein, the components of the PiFM apparatus may be implemented in hardware, and when possible, in software or some combination of the hardware and software. Although not described herein, these embodiments may utilize a computer system to control various components of the PiFM apparatus.

Figure 5:
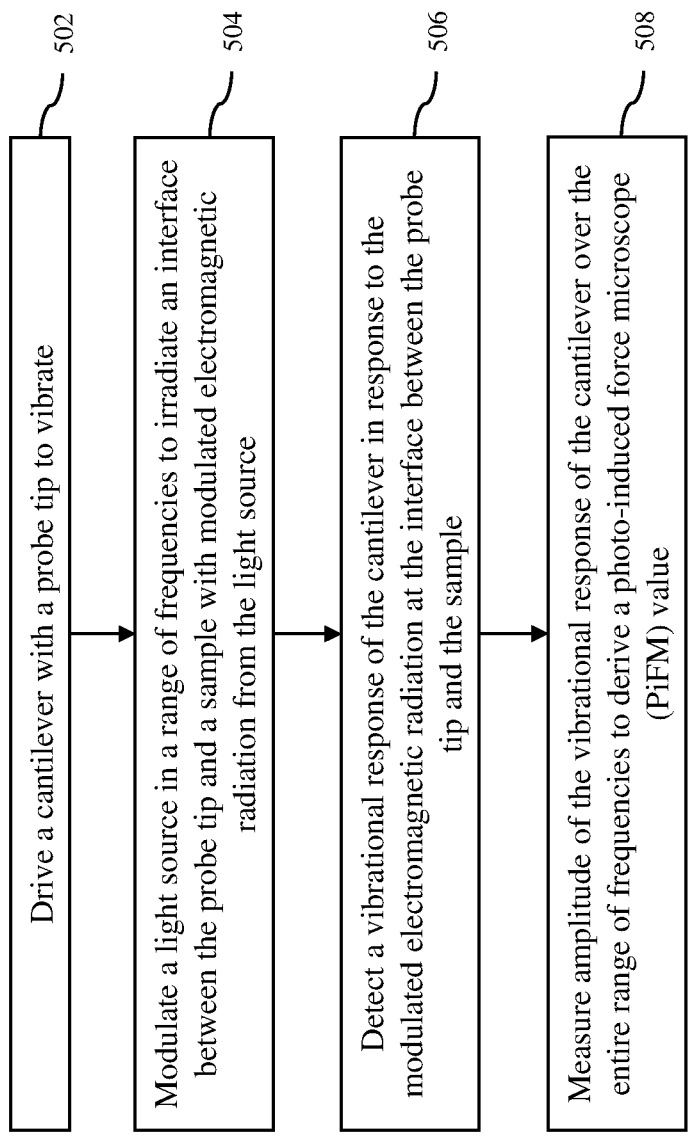
FIG. 5 is a process flow diagram of a method of resonance-enhanced detection using a range of modulation frequencies in accordance with an embodiment of the invention.

A method for resonance-enhanced detection using a scanning probe microscope, such as the PiFM apparatus 200, 300 or 400, in accordance with an embodiment of the invention is described with reference to a flow diagram of FIG. 5. At block 502, a cantilever with a probe tip of the scanning probe microscope is driven to vibrate. The cantilever may be driven by a dither drive unit of the scanning probe microscope. At block 504, a light source is modulated in a range of frequencies to irradiate an interface between the probe tip and a sample with modulated electromagnetic radiation from the light source. In some embodiments, the light source may be modulated by a sweep frequency generator. In other embodiments, the light source may be modulated by a sweep frequency generator. At block 506, a vibrational response of the cantilever in response to the modulated electromagnetic radiation at the interface between the probe tip and the sample is detected. The vibrational response of the cantilever may be detected using a photo position detector. At block 508, amplitude of the vibrational response of the cantilever over the entire range of modulation frequencies is measured to derive a photo-induced force microscope (PiFM) value. The amplitude of the vibrational response of the cantilever over the entire range of modulation frequencies may be measured using an amplitude measuring system, as described herein.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for resonance-enhanced detection using a scanning probe microscope comprising:
    driving a cantilever with a probe tip of the scanning probe microscope to vibrate;
    modulating a light source in a range of frequencies to irradiate an interface between the probe tip and a sample with modulated electromagnetic radiation from the light source;
    detecting a vibrational response of the cantilever in response to the modulated electromagnetic radiation at the interface between the probe tip and the sample; and
    measuring amplitude of the vibrational response of the cantilever over the entire range of modulation frequencies to derive a photo-induced force microscope (PiFM) value.

2. The method of claim 1, wherein the modulating the light source includes applying a frequency-swept modulation signal to the light source so that frequency of the modulated electromagnetic radiation sweeps the range of frequencies, and wherein the measuring the amplitude of the vibrational response of the cantilever over the entire range of modulation frequencies includes integrating the amplitude of the vibrational response of the cantilever over the entire range of modulation frequencies amplitude to derive the PiFM value.

3. The method of claim 1, wherein the vibrational response of the cantilever includes responses to forces or force gradients excited by the modulated electromagnetic radiation at the interface between the probe tip and the sample.

4. The method of claim 3, wherein measuring the amplitude of the vibrational response of the cantilever includes mixing a modulation frequency of the light source and a cantilever dither frequency to derive a sum or difference frequency that is used to detect the forces or force gradients.

5. The method of claim 4, wherein measuring the amplitude of the vibrational response of the cantilever includes using the sum or difference frequency as a reference for a lock-in detector.

6. The method of claim 1, wherein the modulating the light source includes applying a modulation signal to the light source so the modulated electromagnetic radiation simultaneously has the range of frequencies, and wherein the measuring the amplitude of the vibrational response of the cantilever over the entire range of modulation frequencies includes simultaneously measuring the amplitude of the vibrational response of the cantilever in response to the modulated electromagnetic radiation to derive the PiFM value.

7. The method of claim 6, wherein applying the modulation signal to the light source includes generating a modulation waveform that includes a sum or difference of multiple frequency components within the range of frequencies.

8. The method of claim 7, wherein the modulation signal is generated by reverse Fourier transform of a spectral density of the range of frequencies to be applied.

9. The method of claim 6, wherein measuring the amplitude of the vibrational response of the cantilever includes measuring the amplitude of the vibrational response of the cantilever using a bandpass filter and an amplitude detector.

10. The method of claim 1, wherein modulating the light source includes modulating a tunable infrared (IR) laser.

11. A scanning probe microscope comprising:
a cantilever with a probe tip;
a dither drive unit connected to the cantilever to drive the cantilever to vibrate;
a light source to irradiate an interface between the probe tip and a sample;
a signal generator connected to the light source to modulate the light source in a range of frequencies to irradiate an interface between the probe tip and the sample with modulated electromagnetic radiation from the light source,
a detector to detect a vibrational response of the cantilever in response to the modulated electromagnetic radiation at the interface between the probe tip and the sample; and an amplitude measuring system to measure amplitude of the vibrational response of the cantilever over the entire range of modulation frequencies to derive a photo-induced force microscope (PiFM) value.

12. The scanning probe microscope of claim 11, wherein the signal generator is configured to apply a frequency-swept modulation signal to the light source so that frequency of the modulated electromagnetic radiation sweeps the range of frequencies, and wherein the amplitude measuring system is configured to integrate the amplitude of the vibrational response of the cantilever over the entire range of modulation frequencies amplitude to derive the PiFM value.

13. The scanning probe microscope of claim 11, wherein the vibrational response of the cantilever includes responses to forces or force gradients excited by the modulated electromagnetic radiation at the interface between the probe tip and the sample.

14. The scanning probe microscope of claim 13, wherein the amplitude measuring system includes a mixer to mix a modulation frequency of the light source and a cantilever dither frequency to derive a sum or difference frequency that is used to detect the forces or force gradients.

15. The scanning probe microscope of claim 14, wherein the amplitude measuring system includes a lock-in detector connected to the detector to receive the detected vibrational response of the cantilever, the lock-in detector being also connected to the mixer to receive the sum or difference frequency that is used as a reference for lock-in detection.

16. The scanning probe microscope of claim 11, wherein the signal generator is configured to apply a modulation signal to the light source so the modulated electromagnetic radiation simultaneously has the range of frequencies, and wherein the amplitude measuring system includes an amplitude detector to simultaneously measure the amplitude of the vibrational response of the cantilever in response to the modulated electromagnetic radiation to derive the PiFM value.

17. The scanning probe microscope of claim 16, wherein the signal generator is configured to generate a modulation waveform signal that includes a sum or difference of multiple frequency components within the range of frequencies.

18. The scanning probe microscope of claim 17, wherein the signal generator is configured to generate the modulation waveform by reverse Fourier transform of a spectral density of the range of frequencies to be applied.

19. The scanning probe microscope of claim 16, wherein amplitude measuring system includes a bandpass filter and an amplitude detector to measure the amplitude of the vibrational response of the cantilever.

20. The scanning probe microscope of claim 11, wherein the light source is a tunable infrared (IR) laser.

* * * * *